United States Patent [19]

Hosoe et al.

[11] 4,104,652

[45] Aug. 1, 1978

[54] SINGLE LENS REFLEX CAMERA

[75] Inventors: Kazuya Hosoe; Hideo Yokota, both of Tokyo, Japan

[73] Assignee: Canon Kabushiki Kaisha, Tokyo, Japan

[21] Appl. No.: 776,246

[22] Filed: Mar. 10, 1977

[30] Foreign Application Priority Data

Mar. 12, 1976 [JP] Japan .................................. 51-27580

[51] Int. Cl.$^2$ ................................................ G03B 3/00
[52] U.S. Cl. ...................................................... 354/25
[58] Field of Search ....................... 354/25, 198, 60 L; 250/214 P; 356/4

[56] References Cited

U.S. PATENT DOCUMENTS

| 3,185,059 | 5/1965 | Durst | 354/25 |
| 3,691,922 | 9/1972 | König et al. | 354/25 |
| 3,953,729 | 4/1976 | Hosoe et al. | 354/25 X |

Primary Examiner—L. T. Hix
Assistant Examiner—M. L. Gellner
Attorney, Agent, or Firm—Toren, McGeady and Stanger

[57] ABSTRACT

A single lens reflex camera having a sharp focus detecting arrangement with one or more photoelectric cell or cells of an outer zone of a light beam entering through a photo-taking lens wholly or in parts and responsive to transition of light distribution change past the point of sharp focus for producing an electrical output signal. The signal is used to provide a display in the field of view of the camera finder, thereby the accuracy of detection of a condition of sharp focus can be improved regardless of the otherwise insufficient total amount of incident light, as the distinctness of the image, or the relative position of the projection paths in an outer zone of the field is changed by a larger amount than that in the central zone. This arrangement may be embodied in such a manner that a reflex mirror which, in its viewing position, deflects the light from the photo-taking lens to a focusing screen glass is made light-permeable to half or full transmittance either in an outer annular zone or in two parts relatively spaced far from each other in symmetry with respect to the optical axis of the lens, and operates with an auxiliary mirror positioned behind the reflex mirror to deflect the light beam or beams passing through the reflex mirror out of the optical axis to the photoelectric cell or cells.

13 Claims, 20 Drawing Figures

SINGLE LENS REFLEX CAMERA

BACKGROUND OF THE INVENTION

1. Field of the Invention

This invention relates to single lens reflex cameras, and, more particularly, to sharp focus detecting arrangements in such camera which enables a photo-electric sensor to produce an electrical output signal commensurate with focus at an improved sensitivity and reliability.

2. Description of the Prior Art

With an SLR (single lens reflex) camera, in focusing a photo-taking lens, it has been the very common practice for almost any photographer to look through the viewfinder for observation of the degree of sharpness of an image of an object formed on the focusing screen by the taking lens, in other words, to depend upon the critical sense of his naked eye. Consequently, such a screen image-dependent focusing procedure is very troublesome as will be perceived by most beginners in using an SLR camera. The beginner suffers considerably from this painstaking experience until he becomes able to adjust the focus of the image accurately. For general amateur users, therefore, an accurate and quick focusing adjustment of the photo-taking lens is very difficult to achieve.

In order to obviate such an inconvenience, many efforts have been devoted to automatization of the focusing procedure. In the case of the SLR cameras, however, any of the proposed methods and apparatus is not amenable to practical production techniques and, when rendered compatible thereto, leads to the production of extremely high priced cameras. Among such problems, it is very serious that the heretofore attained level of accuracy in detecting a condition of sharp focus is not as high as desired. As a result, the conventional methods and apparatus for automatization of the focusing procedure in SLR cameras have not been employed to the same extent as compared with those for automatization of exposure measurement.

It is known to provide a variety of automatic sharp focus detecting systems. Of these, there exists what may be called TTL type system because of the analogy to the TTL type light metering system in that the light entering through the lens is partly utilized to photo-electrically detect a condition of sharpest focus as the photo-taking lens is shifted. This TTL type focus detecting system is, among other type systems, comparatively suited for incorporation in the SLR camera, particularly because the compactness of the camera structure itself can be preserved to a better extent.

Unlike the TTL type light metering system, however, the TTL type focus detecting system must be designed by due consideration for selection of a position which the photo-electric detecting means is intended to occupy and also for establishment of a focus detecting light arrangement rendering it possible for the photo-electric detecting means to operate with high accuracy and reliability. In other words, while the design feature of the light metering system is not confined to the limitation of the position which the photo-electric detecting means occupies, provided that it can receive light entering through the photo taking lens to detect the object brightness, the deisng feature for the focus detecting system is characterized in that the photo-electric detecting means be responsive to the perfect definition of the object image formed by the photo-taking lens. Thus, the availability of the position which the detecting means is intended to occupy is not so much sufficient as desired. This tends to lead to an increase in the complexity of the camera optical system itself and also to a decrease in the accuracy of sharp focus detection due to the fact that it is made more difficult to achieve fine adjustment of the optical paths for the purpose of varying the position of the plane of sharp focus for the focus detecting optical system accurately as the function of the position of the plane of sharp focus for the photo-taking lens. In the extreme case, it is difficult to secure the compact structure of the camera itself.

To avoid the above-mentioned drawbacks, it is desirable to establish the focus detecting light arrangement by utilizing the viewing mirrow of the camera with modification by the provision of a mirror coating that is partly lightpermeable so as to enable the mirror to serve as a beam divider in combination with an auxiliary mirror positioned behind the viewing mirrow to deflect an image-carrying light beam passing through the viewing mirror towards the detecting means. This embodiment is, because of its structure being simple enough and of the capability of fine adjustment of the optical paths with ease, comparatively advantageous except for the problem that as the total amount of incident light on the image receiving surface of the photo-electric detecting means is reduced, the decreased level of accuracy of sharp focus detection results.

In such a TTL type automatic sharp focus detecting system, therefore, further improvements must be directed to increase the accuracy of sharp focus detection to as high a level as desired regardless of the reduction of the total incident light on the photo-electric detecting means.

SUMMARY OF THE INVENTION

With the foregoing in mind, the present invention is intended to further improve the TTL type automatic focus detecting system for an SLR camera, and it has for its primary object to provide a novel sharp focus detecting light arrangement rendering it possible to focus an image at a fully satisfactory level of accuracy regardless of a relatively small amount of the total incident light on the photo-electric detecting means.

To achieve this, according to the present invention, it is proposed to utilize only that outer portion of a light beam coming through the photo-taking lens which is relatively distant from the optical axis of the lens for the (focus detecting) purpose. In other words, an outer zone of the image-carrying light beam has a larger angle of inclination with respect to the optical axis than the central zone, so that if the taking lens is shifted, the incident light beam position on the film plane is changed by a larger amount in the outer zone than in the central zone. By utilizing only the outer zone of the light beam for focus detecting purpose, it is possible to increase the accuracy of a condition of sharp focus to a fully satisfactory level regardless of the reduction of the total incident light on the photo-electric detecting means independently of whether the focus detecting is performed by sensing variation in the image sharpness, or by sensing variation in the relative position of converging two beams.

Another object of the present invention is to provide a TTL type automatic focus detecting system for an SLR camera with a focus detecting light arrangement embodied by utilizing the viewing mirror of the camera with modification by the provision of a mirror coating that is partly light-permeable so as to enable the mirror to serve as a beam divider in combination with an auxiliary mirror positioned behind the viewing mirror to deflect an image-carrying light beam passing through the viewing mirror towards the photo-electric detecting means, and to improve the accuracy of focus detecting control to as high a level as desired regardless of the reduction of the total light amount of the image-carrying light beam incident upon the photo-electric detecting means.

To achieve this, according to the present invention, it is proposed that the above identified viewing mirror is made light-permeable to half- or full-transmittance in one or more portion or portions either of continuity over an outer zone relatively far spaced from the optical axis of the taking lens, or of at least two outer regions spaced in symmetry with respect to the optical axis, whereby one or more image-carrying light beam or beams coming through the light-permeable portion or portions provided in the viewing mirrow is or are directed to the photo-electric detecting means by the auxiliary mirror.

An aspect of the present invention is that the focusing detecting may be performed either by use of one photo-electric cell responsive to variation of the sharpness of an image of an object resulting from only the outer zone of the image-carrying light beam, or by use of two photo-electric cells responsive to respective light beams picked up from the outer zone of the image-carrying light beam for producing respective output signals differing from each other by a magnitude dependent upon the relative position thereof.

Additional objects and features of the present invention will become apparent from the following detailed description in connection with embodiments when taken in conjunction with the accompanying drawings.

BRIEF DESCRIPTION OF THE DRAWINGS

FIG. 1 is a schematic sectional view of the SLR camera with the construction and arrangement of the basic parts to which the present invention is particularly related.

FIG. 2 is a perspective view showing the detail of an arrangement of two projection paths past aviewing mirror of the camera with reflection from an auxiliary mirror to a photo-electric cell.

FIG. 3 is a side elevational view of a mirror control mechanism by which the viewing mirror and auxiliary mirror are movable between an operative position shown in FIG. 3A and an inoperative position shown in FIG. 3B.

FIG. 4 is a circuit diagram of a display system for use in connection with the photo-electric cell.

FIG. 5 shows the operation principle of the focus detecting system of FIGS. 1 to 4.

FIG. 8 is a schematic view showing an arrangement of those basic parts of an automatic focus detecting system which differs from the embodiment shown in FIGS. 1 to 4.

FIG. 9 is diagrams of geometry considered to define the relative position of two projection paths occurring when the plane of sharpest focus coincides with a film plane for FIG. 9A, when forwardly defocused (the plane is forwardly shifted from the film plane) for FIG. 9B, and when rearwardly defocused (the plane is rearwardly shifted from the film plane) for FIG. 9C.

FIG. 10 is a circuit diagram of a display system for use in connection with the photo-electric cells of FIGS. 8 and 9.

FIG. 11 is a schematic view showing an arrangement of those of the basic parts of an automatic focus detecting system which are especially different from the embodiment shown in FIGS. 1 to 4.

FIG. 12 is diagrams of geometry considered to define the relative position of two projection paths occurring when forwardly defocused for FIG. 12A, and when rearwardly defocused for FIG. 12B.

FIG. 13 is a circuit diagram of a display system for use in connection with the photo-electric cells.

DETAILED DESCRIPTION OF THE PREFERRED EMBODIMENTS

Figure 1:
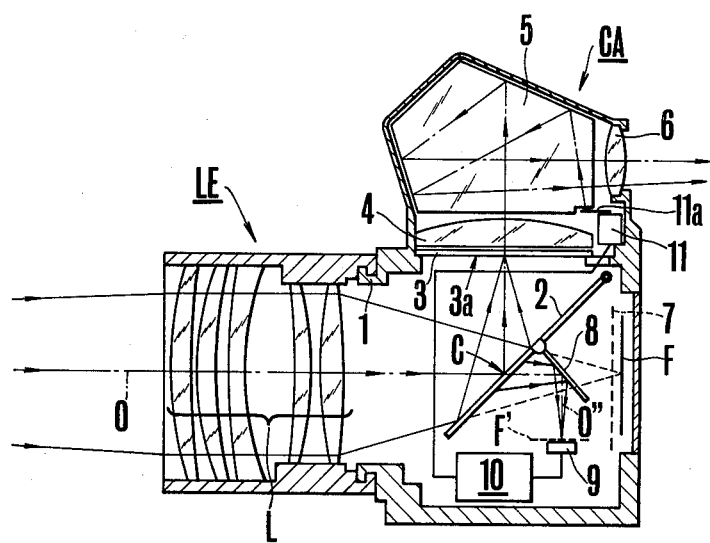
FIGS. 1 to 4 show an embodiment of an SLR camera according to the invention.

Referring to FIGS. 1 to 5 and first to FIG. 1, there is shown a single lens reflex camera having an interchangeable photo-taking lens assembly in a mount LE shiftable along an optical axis O for focusing purposes and attached to a camera body 1 at the front thereof. In the rear of the camera there is shown a shutter 7 behind which a photographic film F is located at the focal plane for the lens L. Located between the lens L and the shutter 7 is a tiltable mirror 2 which in its viewing position as shown in FIG. 1 makes an angle of about 45° with the optical axis O and reflects light entering through the lens L upward onto a focusing screen glass plate 3 having an image receiving surface 3a on the lower side thereof where an image of an object to be photographed is formed at a degree of sharpness equivalent to that of sharpness of an image which is to be formed at the focal plane or film F, when the film F is exposed to the light entering through the lens L with the focusing condition remaining unchanged. Light from the image on the screen 3a is radiated upward through a condenser lens 4 into a penta prism 5 and therefrom directed to an eye-piece 6, reaching an eye of the photographer looking through a camera finder CA.

Figure 2:
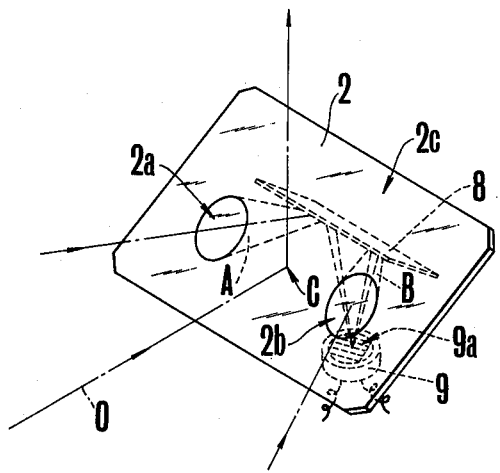
Figure 5A:
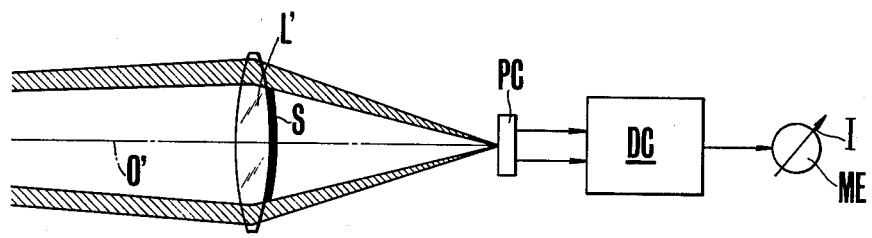
FIG. 5A is a diagram of geometry considered to define the design features of the focus detecting system.

As shown in FIG. 2, the viewing mirror 2 is provided with a mirror coating that is totally reflective with exclusion of two portions 2a and 2b of similar elliptic areas made light-permeable to half- or full-transmittance so as to enable the viewing mirror 2 to serve as a beam divider constituting part of an automatic sharp focus detecting light arrangement of the invention. These two light-permeable portions 2a and 2b are located respectively to the left and right of a point C at which the optical axis of the lens L intersects the viewing mirror 2 in almost symmetrical relation to the point C at such a respective distance from the point C that two light beams can be taken out of the path of the light rays going to the focusing screen 3 in a comparatively far outer or marginal common zone of the field or view of the finder CA as shown in FIG. 5A. It is to be noted in connection with FIG. 5A here that such marginal light beams affect the perfect definition of an image by a larger amount than the central light beam which would be otherwise produced when the shield S corresponding to the totally reflective portion 2c of the viewing mirror 2 is removed. Another advantage arising from the martinal location of the light-permeable portions 2a and 2b is that as a comparatively large central zone of the light beam coming through the photo-taking lens L is totally reflected to the finder means, no large inconvenience will be given to the photographer looking through the finder for inspection of the image.

Figure 5B:
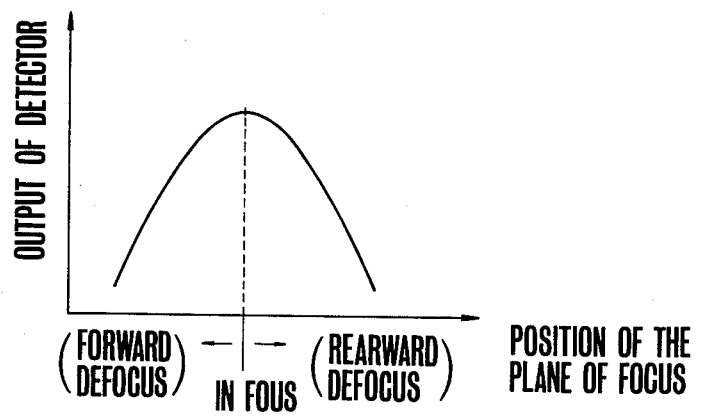
FIG. 5B is a graph showing a variation of the output of the photo-electric cell with respect to the position of the plane of focus as the photo-taking lens is shifted.

Arranged between the viewing mirror 2 and the shutter 7 in the paths of those portions of the light coming through the lens L which are passed by the light-permeable portions 2a and 2b, namely, of the beams A and B is an auxiliary mirror 8 to deflect the beams A and B away from the optical axis O of the lens L to a common photo-cell 9 positioned in a dead space downwardly out of the path of the light rays reaching the film F at the time of exposure. The photo-electric cell 9 has an image-receiving surface 9a arranged to coincide with a plane F' conjugate to the film plane F with respect to the auxiliary mirror 8, and is capable of producing an electrical output signal which is variable with the position of the plane of focus if the lens L is shifted along the optical axis O as shown in FIG. 5B, and which represents the degree of sharpness of an object image to be formed on the film plane by the photo-taking lens L. As the photo-electric cell 9 use can be made of a photo-conductive element such as CdS, or of a photo-voltaic element such as a silicon photo-sensitive element. In the case of the photo-conductive element selected, the phenomenon that the resistance is responsive to variation in the image sharpness is to be utilized. In the case of the photo-voltaic element such as the silicon photo-sensitive element, a great number of minute image-receiving surfaces with the corresponding number of segments rendered operative independently of one another are used to generate respective signals which are then processed to produce an electrical output signal commensulate with the focus, as the degree of sharpness of the image is varied.

Referring again to FIG. 1, the output of the photo-electric cell 9 is applied to a signal processing circuit equipment 10 to be described in detail later. Responsive to the output of the circut 10, an electrical display instrument, in this instance, a meter 11 deflects its pointer 11a relative to a scale not shown, the pointer 11a and the scale being arranged to be visible in the field of view of the finder CA.

Figure 3:
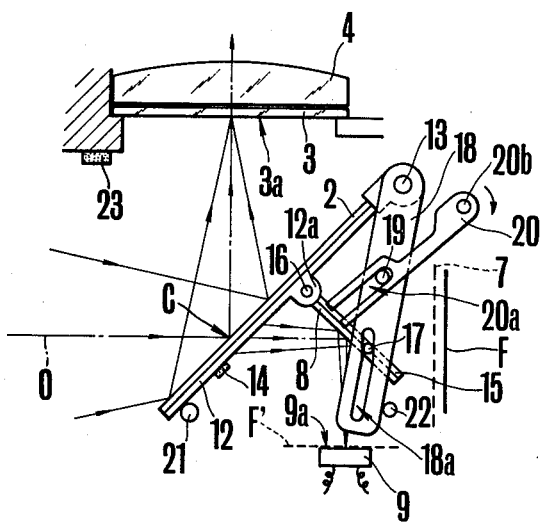
Figure 3:
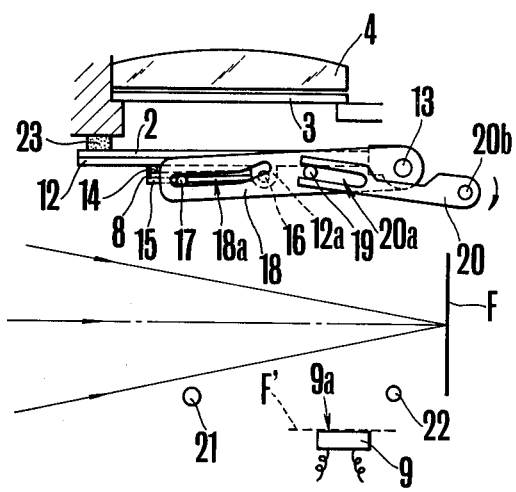

FIG. 3 shows a mirror control mechanism for controlling movement of the beam divider component 2 and the auxiliary mirror component 8 out of the path of the light rays coming from the photo-taking lens L and going to the film F, i.e. from the operative position shown in FIG. 3A to the inoperative position shown in FIG. 3B. The beam divider component 2 is supported by a frame 12 pivotal about a shaft 13 which is secured to the camera housing. The auxiliary mirror 8 is pivotally connected to the rear side of the frame 12 at ears 12a through a shaft 16 rotatable in the holes of the ears 12a and non-rotatably secured to a frame 15 supporting the auxiliary mirror 8. The frame 15 is provided with a cam follower pin 17 extending from one side thereof into a cam slot 18a provided through the wall of a control lever 18 pivotal about the common shaft 13 of the beam divider frame 12. The control lever 18 carries a drive pin 19 positioned near the center thereof and extending into a slot 20a in one end portion of a drive lever 20, the other end of which is non-rotatably secured to a rod 20b rotatably supported in a not shown suitable bearing and operatively connected to a not shown release mechanism for the camera.

For the purpose of adjusting the angular positions of the mirrors 2 and 8, there are provided pins 21 and 22 which may be adjustably mounted on the side wall of the camera housing and against which the frame and the control lever 18 are brought into abutment respectively, when the mirror control mechanism is set to the operative position.

In operating the mirror control mechanism of the construction described above, when the various parts are in the positions shown in FIG. 3A, in which the beam divider support frame 12 and the control lever 18 are automatically adjusted in position by the respective pins 21 and 22, the viewing mirror 2 is set in the path of the light coming through the photo-taking lens L so that the part of the light which is reflected from the totally reflective portion 2c and from the half-mirrored portions 2a and 2b goes to the focusing screen 3, while the other part which penetrates the viewing mirror 2 at the portions 2a and 2b is reflected by the auxiliary mirror 8, reaching the image-receiving surface 9a of the photo-electric cell 9.

After a correct focusing adjustment of the photo-taking lens L has been attained, when a not shown release button is operated, the rod 20b is driven for rotation in the clockwise direction indicated by an arrow with simultaneous clockwise rotation of the drive lever 20, whereby the control lever 18 is turned about the shaft 13 in the clockwise direction through the pin 19-and-slot 20a connection.

During the mirror movement control process by the lever 18, at first, the auxiliary mirror support frame 15 and, with it, the shaft 16 are pivoted through the pin 17-and-cam slot 18a connection with respect to the viewing mirror frame 12 which remains stationary until the auxiliary mirror 8 is nested on the rear side of the frame 12 through a shock absorber 14 made from spongy material. Thereafter, the viewing mirror frame 12 is carried along with the auxiliary mirror 8 as pivoted about the shaft 13 by the further pivoting of the control lever 18 until the viewing mirror 2 strikes at its free end against a shock absorber or sponge 23 mounted on a portion of the camera housing frame. The resultant positions of the various parts are shown in FIG. 3B. This upward movement of the mirror components 2 and 8 has, of course, been completed in a very short time interval before the actuation of the shutter 7 for initiating an exposure. In this way, the viewing mirror 2 and auxiliary mirror 8 are taken out of the path of the light beam coming from the photo-taking lens L and going onto the film F. It is to be noted here that the nesting of the auxiliary mirror 8 on the back side of the beam divider 2 assures to shut out any light which might otherwise penetrate through the light-permeable portions 2a and 2b into the interior of the camera through the finder optical system. After the exposure has been completed, or after the shutter is closed again, the mirror components 2 and 8 are automatically returned to the initial normal positions shown in FIG. 3A.

Figure 4:
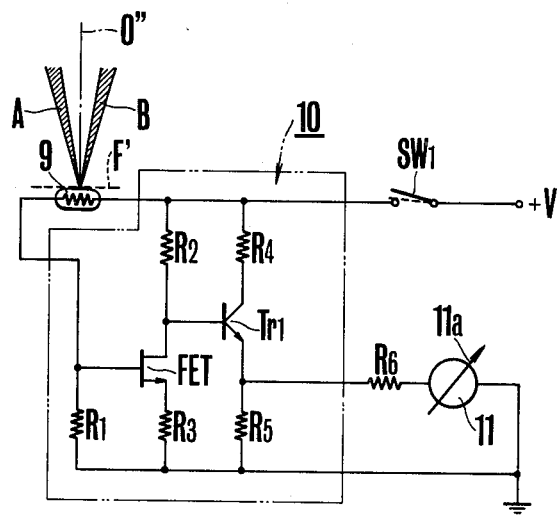

FIG. 4 shows an example of the circuitry of a display system for use in connection with the photo-electric cell 9. This circuit includes a sensor circuit enclosed in a dashed line block 10 comprising a field effect transistor FET having a gate connected to a point on connection between a resistor R1 and one pole of the photo-electric cell 9, the other pole being connected through a resistor R2 and a drain of FET, and having a source connected through a resistor R3 to a negative but grounded, and a transistor $Tr_1$ having a base connected to a point on connection between the resistor R2 and the drain of FET, having a collector connected through a resistor R4 to a common positive bus of the resistor R2 and which is connected through a normally open switch SW1 to a positive potential source +V, and having an emitter connected through a resistor R5 to the negative bus. The output of the sensor circuit 10 which appears at a point on connection between the emitter and resistor R5 is applied through a resistor R6 to the meter 11 having the pointer 11a at one end of the winding thereof, the opposite end of which is grounded.

Now assuming that the resistance of the photo-electric cell 9 is increased as the degree of sharpness of an image thereon is improved, when the photo-taking lens L is shifted with the resulting image sharpness being improved, increasing potentials occur at the gate of the field effect transistor FET, causing decreasing conductances of FET with simultaneous occurrence of increasing potentials at the base of transistor $Tr_1$, thereby the collector-emitter current of transistor $Tr_1$ is increased, reaching a maximum level when a condition of sharpest focus is attained. At this time, the meter 11 deflects its pointer 11a to a maximum possible position. Upon looking through the eye-piece 6, therefore, the photographer will be informed of the fact that the focusing adjustment of the lens L as by turning a focusing ring has just come to end.

Figure 6A:
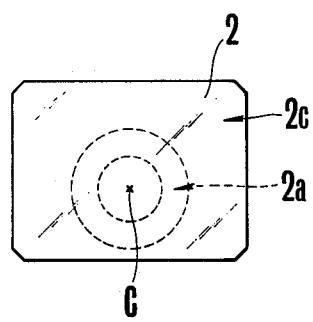
FIGS. 6A to 6C are plane views showing three variations of the arrangement of the light-permeable parts on the viewing mirror of FIG. 2.
Figure 6B:
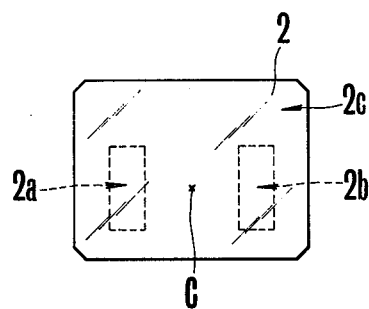
Figure 6C:
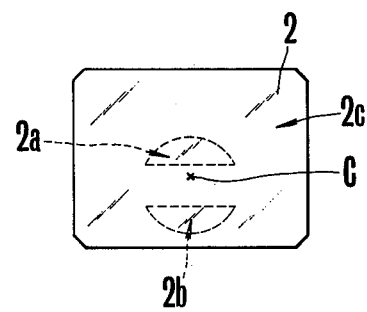

The sharp focus detecting light arrangement described above is characterized by providing in the viewing mirror 2 for two light-permeable portions 2a and 2b of half-transmittance as laterally spaced apart from each other and configured to eliptical areas (see FIG. 2). This number, orientation and configuration of the beam dividing portions may be changed as exemplified in FIGS. 6A to 6C. In FIG. 6A, there is shown a single outer annular zone 2a of continuity centered at the point C and comparatively far distantly spaced from the point C so that a single beam of ring shape can be obtained. In FIG. 6B, there is shown two rectangular light-permeable portions 2a and 2b positioned in a common outer zone in almost laterally symmetrical relation to the point C. In FIG. 6C, there is shown two light-permeable portions 2a and 2b of semicircle areas vertically spaced from each other on the respective opposite sides of the point C but in a common outer zone of the field as the mirror assumes a 45° angular position in the camera body. Although the light-permeable portion is described as made half-transparent, it is of course admitted to make it full-transparent.

Figure 7:
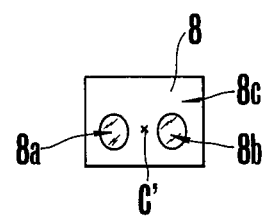
FIG. 7 is a plane view showing an example of arrangement of two reflective parts provided on the auxiliary mirror.

In the above, the beam dividing function for extracting one or more beam or beams from an image-forming light at an outer zone distant from the optical axis has been described as imparted to the viewing mirror 2, but otherwise may be imparted into the auxiliary mirror 8, as shown in FIG. 7, wherein the auxiliary mirror 8 is shown as made totally reflective only at two portions 8a and 8b of round or elliptic shape positioned in almost symmetrical relation to a point C' at which the optical axis of the lens L intersects the mirror 8 and in a comparatively distant outer zone of the field, while the other area 8c is made light-absorptive. If such an auxiliary mirror 8 is used in combination with a viewing mirror which is half-mirrored over the entire area thereof, an equivalent light arrangement to that shown in connection with FIGS. 1 to 6 can be established. It is of course possible to utilize FIG. 2 or 6 mirror 2 in combination with the mirror of FIG. 7.

Although this embodiment of the SLR camera has been described as employing the method of sharp focus detection by use of only one photo-electric cell 9 which operates with two beams A and B, it is also very effective to construct the sharp focus detecting light arrangement by use of two photo-electric cells for the respective marginal beams A and B, whereby upon detection of a difference between the outputs of these two cells (not of variation of the image sharpness), it is made possible to indicate when the image is not in focus and to further indicate the direction in which an adjustment must be made to bring the image into focus, as shown in connection with the embodiments that follow.

Figure 8:
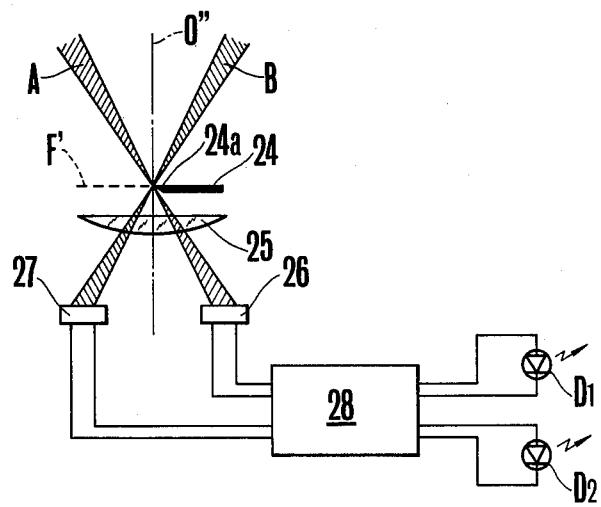
FIGS. 8 to 10 show another embodiment of the invention, in which a pair of photo-cells are employed as the focus detecting means.

Referring to FIGS. 8 and 9, a second embodiment of the sharp focus detecting light arrangement according to the present invention is shown comprising two photo-electric cells 27 and 26 positioned behind a focal plane F' conjugate to the focal plane of film with respect to the auxiliary mirror 8 (see FIGS. 1 and 2) to receive the light beams A and B respectively, a light shield plate 24 having a knife edge 24a formed at one end thereof and positioned in coincidence with the focal plane F' at a location such that the knife edge 24a is spaced by a very small distance from an ideal optical axis O'' (see FIG. 1) substantially contiguous to the optical axis of the lens L, and a field lens 25 positioned between the focal plane F' and the photo-electric cells 26 and 27 in the paths of the light beams A and B. The outputs of photo-electric cells 26 and 27 are compared by a detecting circuit 28 to produce an output signal commensulate with the focus which is displayed in the field of view of finder by a pair of light emitting diodes D1 and D2 used instead of the meter 11 of FIG. 1.

Figures 9A, 9B:
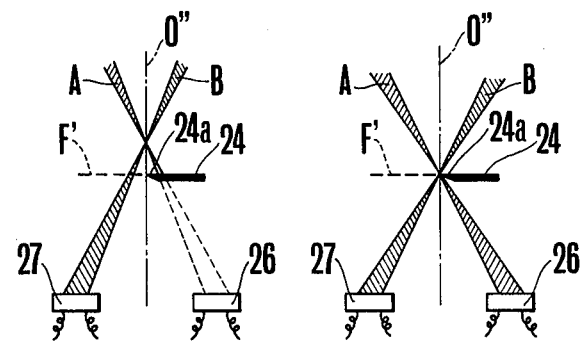
Figure 9C:
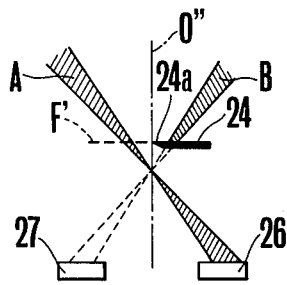

By reference to FIGS. 9A to 9C, the automatic focus detecting principle of the second embodiment will be explained below. If the lens L is correctly adjusted in sharp focus position, the plane of focus is in coincident with the film plane. At this time, the two light beams A and B converge to a common point coincident with the point at which the ideal optical axis O'' intersects the conjugate focal plane F' so that any of the two beams A and B is not affected by the light shield plate 24, causing the two cells 26 and 27 to receive equal light amounts to each other as shown in FIG. 9A. If the converging point of the two beams A and B is forwardly shifted from the conjugate plane F' as shown in FIG. 9B, i.e. if the image is forwardly defocused, the paths of the two beams A and B are changed so that one beam A is interrupted wholly or in part by the shield plate 24, while the other beam B being permitted to arrive at the photo-electric cell 27, thereby the incident light upon the cell 26 is reduced as compared with that on the cell 27. Conversely, if the converging point is rearwardly shifted from the conjugate plane F' (rearwardly defocused) as shown in FIG. 9C, the opposite beam B is interrupted wholly or in part by the light shield plate 24, thereby the incident light on the cell 27 is reduced as compared with that on the cell 26. Consequently, it is made possible not only to detect a condition of sharpest focus by having the outputs of the cells 26 and 27 compared by the detecting circuit 28 but also to detect the direction in which the plane of focus is shifted, or the so-called "the polarity of defocus".

Figure 10:
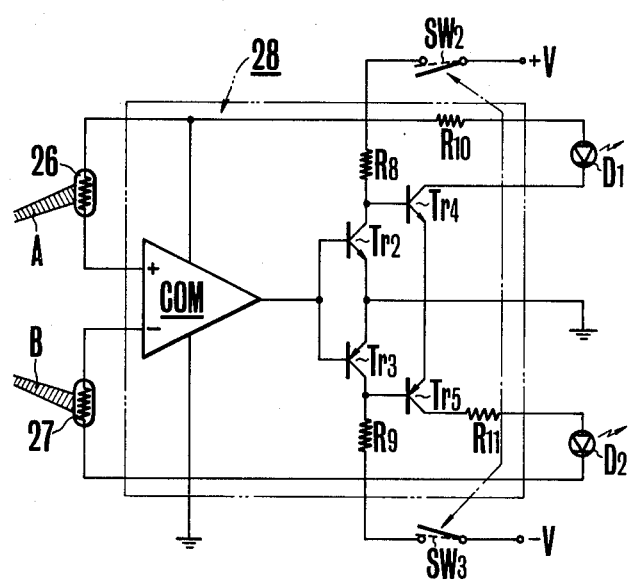

FIG. 10 shows the detail of the above mentioned detecting circuit 28 enclosed in a dashed line block comprising a comparator COM having a "plus" input terminal connected to one photo-electric cell 26 at one end, the opposite end of which is connected to a positive bus, and having a "minus" input terminal connected to the other photo-electric cell 27 at one end, the opposite end of which is connected to a negative bus, two transistors $Tr_2$ and $Tr_3$ having bases connected to a common output terminal of the comparator COM, having emitters grounded, and having collectors connected through respective resistors R8 and R9 to the positive and negative buses respectively, and additional two transistors $Tr_4$ and $Tr_5$ having emitters grounded, and having bases connected to respective collectors of transistors $Tr_2$ and $Tr_3$. The collector of the transistor $Tr_4$ is connected to the cathode of the light emitting diode D1 of which the anode is connected through a resistor R10 to the positive bus. The collector of the transistor $Tr_5$ is connected through a resistor R11 to the anode of the light emitting diode D2 of which the cathode is connected to the negative bus. The positive and negative buses are connected through respective normally open switches SW2 and SW3 to respective potential sources $+V$ and $-V$.

The operation of an SLR camera employing the focus detecting system of the construction described above will next be explained. Now assuming that both photo-electric cells 26 and 27 have identical light response characteristics to each other such that their resistances are increased as the incident lights thereon are increased. At first, when both switches SW2 and SW3 are closed, electrical powers of $+V$ (volt) and $-V$ (volt) are applied to the detecting circuit 28. Then, the photographer may hold this camera in alignment with an object which is intended to be photographed. Assuming again that the coverging point of the both beams A and B comes in behind the conjugate focal plane F' as shown in FIG. 9C where the path of the beam B going to the cell 27 is blocked by the light shield plate 24 so that the amount of light incident upon the cell 27 is made smaller than that of light incident upon the cell 26, it is resulted that the comparator COM produces an output signal of "plus" polarity, thereby transistor $Tr_2$ is turned on, while transistor $Tr_3$ is turned off. This in turn causes transistor $Tr_4$ to be turned off and transistor $Tr_5$ to be turned on, so that while the light emitting diode D1 remains de-energized, the other lightemitting diode D2 is energized to indicate that an image of the object formed by the photo-taking lens L is rearwardly defocused at the focal plane. Alternatively assuming that the converging point of the both beams A and B comes in front of the conjugate focal plane F' as shown in FIG. 9B, where the path of the light beam A going to the cell 26 is blocked by the light shield plate 24 so that the amount of light incident upon the cell 26 is made smaller than that of the light incident upon the cell 27, it is resulted that the comparator COM produces an output signal of "minus" polarity, thereby transistor $Tr_2$ is turned off, while transistor $Tr_3$ is turned on. This in turn causes transistor $Tr_4$ to be turned on and transistor $Tr_5$ to be turned off. As a result, while the light emitting diode D2 is deenergized, the other light emitting diode D1 is energized to indicate that the object image formed by the photo-taking optical system L is forwardly defocused at the film plane, as can be seen in the field of view of the finder.

When a correct focusing adjustment has been attained with the converging point of the beams A and B being on the conjugate focal plane F' as shown in FIG. 9A, any of the paths of the light beams A and B is blocked by the light shield plate 24, causing the both cells 26 and 27 to receive equal amounts of light to each other. As a result, the comparator COM oscillates between the power source voltages $+V$ (volt) and $-V$ (volt) at a predetermined frequency, thereby transistors $Tr_2$ and $Tr_3$ and, therefore, transistors $Tr_4$ and $Tr_5$ are alternately turned on and off. As a result, the two light emitting diodes D1 and D2 are caused to flicker at a frequency corresponding to that of oscillation of the comparator COM. This frequency is so high that the photographer looking at the diodes D1 and D2 is perceived of an impression of continuous lighting thereof both at a time.

With this SLR camera, therefore, while looking through the finder, the photographer may turn the focusing ring in a direction dependent on which of the light emitting diodes D1 and D2 is lighted on until both of the diodes D1 and D2 become lighted on at the same time, thereupon a correct focusing adjustment of the photo-taking lens L is automatically effected to the sharpest focus.

Figure 11:
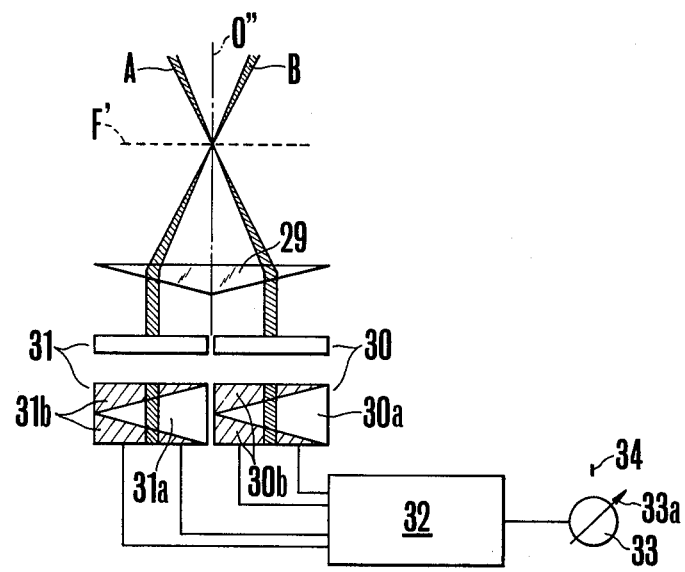
FIGS. 11, 12 and 13 show still another embodiment of the invention in which a pair of photo-electric cells are used as arranged to serve as position sensors.
Figures 12A, 12B:
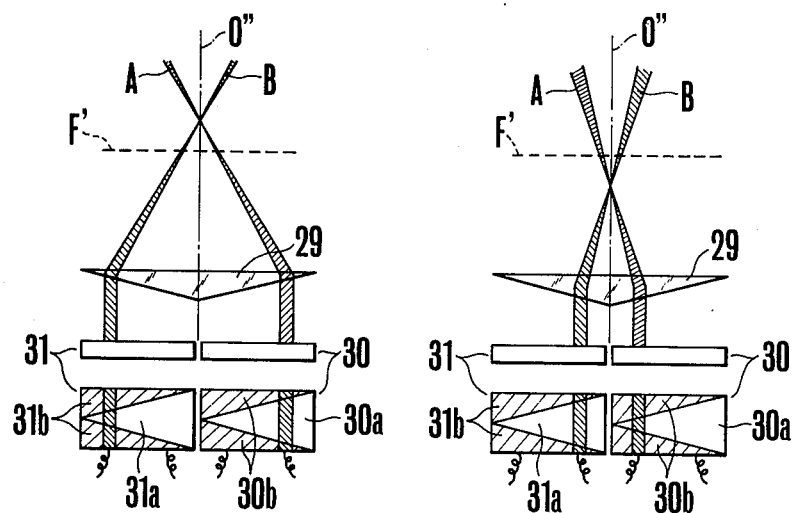
Figure 13:
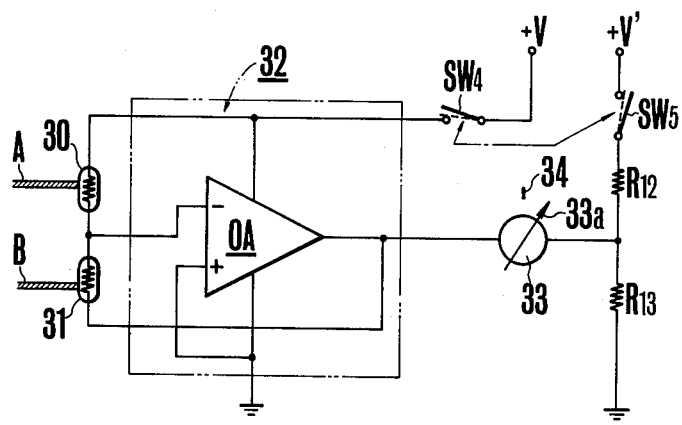

Referring to FIGS. 11 to 13, there is shown the third embodiment of the invention in which two photo-electric cells are adapted to function as position sensors. At first, in FIG. 11, the focus detecting light arrangement comprises a deflection prism 29 positioned behind the conjugate focal plane F' in the paths of the beams A and B coming from the auxiliary mirror 8 (see FIGS. 1 and 2) to deflect the beams A and B to respective directions parallel with the ideal optical axis O" independently of the positions of the light paths thereof, and two position sensors 30 and 31 positioned to receive the beams A and B coming from the deflection prism 29 respectively. The position sensors 30 and 31 have light sensitive image-receiving surfaces 30a and 31a configured to identical isosceles triangles to each other in association with respective masks 30b and 31b on the common image-receiving surfaces thereof. The position sensors 30 and 31 are so oriented that their isosceles triangles point to a common direction parallel to that in which the incident points of the beams A and B on the respective image-receiving surfaces 30a and 31a are moved as the degree of sharpness of the image is varied, and so located that when the image is in focus as shown in FIG. 11, the amounts of light incident upon the light sensitive surface areas 30a and 31a are made equal to each other, provided that the widths of the rectangular section beams A and B are equal to each other. It is preferred that the beam width is as narrower as possible for the purpose of assuring the accuracy of focus detection. In order to produce such beams, it is desirable to employ the viewing mirror 2 of the type shown in FIG. 6B but with modification of its light-permeable portions 2a and 2b as far narrowed in width to slit-like areas.

The outputs of the position sensors 30 and 31 are processed by a circuit 32 to produce an output signal commensulate with the focus which is displayed by a meter 33 having a pointer 33a cooperative with an index 34 for the condition of sharpest focus.

By reference to FIGS. 12A and 12B in connection with FIG. 11, the focus detecting principle of the third embodiment will next be explained. As the prism 29 functions to deflect into directions almost parallel to the ideal optical axis O″ the two beams A and B incident thereon at any angles with respect to the ideal optical axis O″, the distance between the beams A and B after deflected by the prism 29 is varied as a function of the image sharpness. For example, as shown in FIG. 12A, where the common converging point of the beams A and B is in front of the conjugate focal plane F′ (forwardly defocused), the beam distance is wider than that occurring when the converging point of the beams A and B is coincident with the point at which the ideal optical axis intersects the conjugate focal plane F′, or when the image is in focus. On the other hand, as shown in FIG. 12B, when the converging point of the two beams A and B is in rear of the conjugate focal plane F′ (rearwardly defocused), the beam distance is smaller than that shown in FIG. 11.

Therefore, as mentioned above, when the positions of the position sensors 30 and 31 are adjusted relative to the prism 29 so that the two beams A and B which converges at a common point coincident with the intersection point between the ideal optical axis O″ and the conjugate plane F′ come to impinge upon the respective image-receiving surfaces at the same phase, and when the orientations of these sensors 30 and 31 are so adjusted that the directions in which the photo-sensitive areas 30a and 31a become progressively smaller or larger are coincident to each other, it is made possible to detect not only when the image is not in focus but also the direction in which an adjustment must be made to bring the image into focus.

FIG. 13 shows the detail of the detection circuit 32 enclosed in a dashed line block comprising an operational amplifier OA having an inversion input terminal connected to a point on connection between the position sensors 30 and 31 at one ends thereof, the opposite ends of which are respectively connected to the positive bus and the output terminal of the operational amplifier OA, and having a noninversion input terminal grounded. The output terminal of the operational amplifier OA is also connected to the meter 33 at one end of the winding thereof, the other end being connected to a point on connection between resistors R12 and R13. The positive bus is connected through a normally open switch SW4 to a positive potential source +V, and the voltage divider R12, R13 is connected through a normally open switch SW5 to the positive potential source +V.

Now assuming that the position sensors 30 and 31 have such identical light response characteristics to each other that as the amount of light incident upon the light sensitive areas 30a and 31a are increased, their resistances are increased, because of the fact that the position sensors 30 and 31 are respectively connected in the input stage and feedback network of the operational amplifier OA, when the incident light amounts on the both sensors 30 and 31 are made equal to each other as shown in FIG. 11, the amplifier OA takes a gain of unity. When the light amount incident upon the sensor 30 is made larger than that on the sensor 31, or when the image is forwardly defocused as shown in FIG. 12A, and, therefore, the resistance of the sensor 30 is larger than that of the sensor 31, the gain is less than unity, while when the light amount incident upon the sensor 30 is made smaller than that on the sensor 31, or when the image is rearwardly defocused as shown in FIG. 12B, and, therefore, the resistance of the sensor 31 is smaller than that of the sensor 31, the gain exceeds unity.

When the gain is unity, the output of the amplifier OA is maintained constant at a level corresponding to the input voltage +V (volt). If the voltage divider R12, R13 is adjusted to produce a voltage equal to the above-mentioned level, the meter pointer 33a assumes a "null" position in alignment with the index 34, provided that the image is in focus, and is caused to deflect to the left or right of the index 34 when the image is not in focus.

The operation of the SLR camera employing the third embodiment of the focus detecting system of the invention will next be explained in brief. After the both power switches SW4 and SW5 are closed to apply electrical power to the detecting circuit 32 and meter 33 from its sources +V and +V (volt), the camera may be aligned with an object which is intended to be photographed. For example, when the converging point of the beams A and B is in front of the conjugate plane F′ as shown in FIG. 12A, the resistance of sensor 30 is larger than that of sensor 31, so that the gain of amplifier OA becomes smaller than unity, and, therefore, the pointer 33a of meter 33 is deflected, for example, to the left of the index 34. Conversely, when the converging point of the beams A and B is in rear of the conjugate plane F′ as shown in FIG. 12B, the resistance of sensor 31 becomes larger than that of sensor 30, so that the gain of amplifier OA becomes larger than unity, and, therefore, the pointer 33a is deflected to the right of the index 34.

While looking through the view finder, therefore, the photographer can adjust the photo-taking lens L to the condition of sharp focus by turning the focusing ring in the direction dependent upon which side the meter pointer 33a is deflected to until the pointer 33a is placed in alignment with the index 34.

It will be seen from the foregoing description in connection the three embodiments that the present invention contemplates the utilization of the viewing mirror and/or the auxiliary mirror positioned behind the viewing mirror for picking up that portion of an image-carrying light beam coming from the photo-taking lens of the camera which is comparatively far spaced from the optical axis of the lens, and which is directed to photoelectric detecting means. As the detecting means is rendered receptive of only this outer marginal light beam in the field of view, the accuracy of detection of a condition of sharp focus can be improved to as high a level as desired regardless of the large reduction of the absolute amount of the light incident upon the photoelectric detecting means.

What is claimed is:

1. A single lens reflex camera comprising:
(A) a photo-taking lens system having an optical axis and adjustable along the axis so as to form an object image on a predetermined film plane;
(B) a view finder optical system adapted for viewing the object image to be formed on the film plane by the lens system from outside the camera;
(C) a viewing mirror for deflecting an image light coming from said lens system to said view finder optical system;
(D) an auxiliary mirror arranged behind said viewing mirror, at least one of said viewing mirror and said auxiliary mirror having a function of causing only at least one part of the image light coming through said taking lens system in an outer zone comparatively distant from a center thereof to go out from the path of the light going to the film plane; and (E) photo-electric detecting means for detecting the focusing condition of the lens system to the object, said detecting means being arranged to receive only said image light of the outer zone through said auxiliary mirror and being responsive to said image light of the outer zone to produce a signal corresponding to the focusing condition of the lens system to the object.

2. A single lens reflex camera according to claim 1, wherein said viewing mirror is provided with a light-permeable portion for causing only said image light of the outer zone to impinge on said photo-electric detecting means, said light-permeable portion being formed substantially in an outer zone comparatively distant from the optical axis of the lens system, said auxiliary mirror being arranged in correspondence to said light-permeable portion to deflect the image light coming through said light-permeable portion to said photo-electric detecting means.

3. A single lens reflex camera according to claim 2, wherein said photo-electric detecting means includes a photo-electric detecting cell responsive to the variation in the image sharpness, said detecting cell being arranged with its image-receiving surface coincident with a plane optically equivalent to said film plane and producing a signal corresponding to the sharpness of the object image formed by the lens system upon receiving of the image light coming through the light-permeable portion in said viewing mirror through said auxiliary mirror.

4. A single lens reflex camera according to claim 1, wherein said viewing mirror is provided with two light-permeable portions for causing only two parts of the image light almost symmetrical to each other with respect to the optical axis of the lens system to impinge upon said photo-electric detecting means, said two light-permeable portions being formed in respective outer regions substantially symmetrical to each other with respect to the optical axis of the lens system, said auxiliary mirror being arranged in correspondence to said two light-permeable portions to deflect the image light coming through said two light-permeable portions respectively to said photo-electric detecting means.

5. A single lens reflex camera according to claim 4, wherein said photo-electric detecting means includes a photo-electric detecting cell responsive to the variation in the image sharpness, said detecting cell being arranged with its image-receiving surface coincident with a plane optically equivalent to said film plane and producing a signal corresponding to the sharpness of the object image formed by the lens system upon receiving of the image light coming through the two light-permeable portions in said viewing mirror through said auxiliary mirror.

6. A single lens reflex camera according to claim 4, wherein said photo-electric detecting means includes two photo-electric detecting cells arranged in rear of a plane optically equivalent to said film plane so as to receive the respective image lights of said two outer regions; and said camera further comprises electrical circuit means for producing a focusing signal presenting the focusing condition of the lens system to the object based on the outputs of said two detecting cells, said circuit means being electrically connected to said two cells and producing said focusing signal on the basis of the difference between the outputs of the two cells.

7. A single lens reflex camera according to claim 6, further comprising light shielding means for varying the amount of light incident upon said two photo-electric detecting cells in accordance with variation of the imaging position of the object image formed by the lens system, said light shielding means being fixedly arranged in coincidence with said plane optically equivalent to the film plane, said two detecting cells being responsive to variation of the light amount incident thereon for producing a signal corresponding to variation of the light amount incident upon its image-receiving surface, and said electrical circuit means being capable of producing a signal corresponding to the amount of deviation of the imaging position of the object image formed by the lens system from said film plane based on the difference between the outputs of said two cells.

8. A single lens reflex camera according to claim 6, wherein said two photo-electric detecting cells are formed as position sensors responsive to variation of the position of light beams incident upon their respective light sensitive surfaces, and said electrical circuit means produces said focusing signal based on the difference between the outputs of said position sensors.

9. A single lens reflex camera according to claim 1, wherein said viewing mirror is provided with at least one light-permeable portion formed in correspondence to said auxiliary mirror, and said auxiliary mirror is provided with two light-reflective portions for causing only two image light parts of the outer region almost symmetrical with respect to the optical axis of the lens system in the image light coming through said light-permeable portion of the viewing mirror to deflect and impinge on said photo-electric detecting means, said two light-reflective portions being formed in two outer regions substantially almost symmetrical to each other with respect to the optical axis of the lens system.

10. A single lens reflex camera according to claim 9, wherein said photo-electric detecting means includes a photo-electric detecting cell which is responsive to the variation in the image sharpness, said detecting cell being arranged with its light sensitive surface coincident with a plane optically equivalent to said film plane and producing a signal corresponding to the sharpness of the object image formed by the lens system upon receiving of the image lights coming from said auxiliary mirror after reflection from its two light-reflective portions to produce a signal corresponding to the sharpness of the object image formed by the lens system.

11. A single lens reflex camera according to claim 9, wherein said photo-electric means includes two photo-electric detecting cells arranged in rear of a plane optically equivalent to said film plane so as to receive the respective image lights of said two outer regions; and said camera further comprises electrical circuit means for producing a focusing signal presenting the focusing condition of the lens system to the object based on the outputs of said two detecting cells, said circuit means being electrically connected to said two cells and producing said focusing signal upon the basis of the difference between the outputs of the two cells.

12. A single lens reflex camera according to claim 11, further comprising light shielding means for varying the amount of light incident upon said two photo-electric detecting cells in accordance with variation of the imaging position of the object image formed by the lens system, said light shielding means being fixedly arranged in coincidence with said plane optically equivalent to the film plane, each of said two detecting cells being responsive to variation of the light amount incident thereon and producing a signal corresponding to variation of the light amount incident upon its light sensitive surface, and said electrical circuit means being capable of producing a signal corresponding to the amount of deviation of the imaging position of the object image formed by the lens system from said film plane based on the difference between the outputs of said two cells.

13. A single lens reflex camera according to claim 11, wherein said two photo-electric detecting cells are formed as position sensors responsive to variation of the position of light beams incident upon their respective light sensitive surfaces, and said electrical circuit means produces said focusing signal based on the difference between the outputs of said position sensors.

* * * * *